United States Patent [19]

Fisher et al.

[11] Patent Number: 4,520,838

[45] Date of Patent: Jun. 4, 1985

[54] VALVE FOR HIGH PRESSURE FLUID CONTAINER

[75] Inventors: John M. Fisher, Cuyahoga Falls; James C. Putt, Barberton, both of Ohio

[73] Assignee: The B.F. Goodrich Company, Akron, Ohio

[21] Appl. No.: 510,001

[22] Filed: Jul. 1, 1983

[51] Int. Cl.³ .............................................. F16K 13/04
[52] U.S. Cl. .................. 137/69; 137/505.13; 137/613; 222/3; 222/541
[58] Field of Search .......... 137/68 R, 69, 514, 505.13, 137/505.18, 613; 251/64; 222/3, 5, 541

[56] References Cited

U.S. PATENT DOCUMENTS

| | | | |
|---|---|---|---|
| 1,779,056 | 10/1930 | Hill | 137/69 |
| 1,863,455 | 6/1932 | Rowley | 137/69 |
| 1,874,356 | 8/1932 | Rowley | 137/69 |
| 1,900,764 | 3/1933 | Rowley | 137/69 |
| 2,071,376 | 2/1937 | Allen | 137/514 X |
| 2,092,793 | 9/1937 | Abercrombie | 137/514 X |
| 2,608,209 | 8/1952 | Bryant | 92/95 X |
| 3,623,495 | 11/1971 | Erb | 137/69 |
| 4,181,139 | 1/1980 | Martini | 137/68 A |
| 4,276,902 | 7/1981 | Roth | 137/505.18 |
| 4,305,423 | 12/1981 | Adler | 137/505.13 |

FOREIGN PATENT DOCUMENTS 2252519  7/1975  France .................. 137/68 R

Primary Examiner—Martin P. Schwadron
Assistant Examiner—Stephen M. Hepperle
Attorney, Agent, or Firm—Joseph Januszkiewicz

[57] ABSTRACT

A valve having a valve housing for mounting on a high pressure fluid container. A cartridge is mounted in a fluid conduit in the valve housing leading to the fluid container. A metallic disc is crushed by the cartridge against a valve seat in the conduit to provide a reliable lasting seal. Opening of the valve is provided by releasing a trigger pin connected to a latch in the cartridge for removing a support from a portion of the disc permitting it to rupture under the high pressure and communicating the high pressure gas to a pressure regulator chamber in cross configuration with the valve conduit in the valve housing. A pressure regulator member in the chamber controls the size of a discharge orifice for lowering the pressure and introducing the gas into an inflatable body. Filling of the high pressure fluid container may be done by introducing high pressure fluid into the regulator for passage into the fluid conduit of the valve with the cartridge carrying the disc spaced from the valve seat. After the container is filled the cartridge including the disc support moves the disc into sealing engagement with the valve seat.

4 Claims, 5 Drawing Figures

VALVE FOR HIGH PRESSURE FLUID CONTAINER

BACKGROUND OF THE INVENTION

This invention relates to valves and fluid pressure regulators used in inflation systems for inflatable escape slides and other inflatables where the output pressure of the gas flow is different than the pressure of the high pressure gas supply. Heretofore, the regulation function and the valve function have been combined in a single pressure regulator. This has presented problems because the high compression loading on the the O-ring seals places them under a substantial load and therefore they are more likely to stick and cause regulation malfunctions. At the present time the valve function is required to retain pressurized gas within a reservoir at nominal pressures of 3,000 pounds per square inch (210.92 kilograms per square centimeter) for periods of up to 10 years with virtually no leakage. It has been the practice to use O-rings of rubber or other resilient material with this type of regulator. In order to prevent leakage the pressure applied to the O-rings has been increased, however; this tends to cause the rings to stick when used in a dynamic application after being held in a static condition an appreciable length of time. This problem is especially acute with regulators for inflatable escape slides which are not used for long periods of time between periodic tests.

SUMMARY OF THE INVENTION

The valve and regulator of this invention provides in a single valve housing a valve function to retain the high pressure gas in the high pressure fluid container by means of a valve cartridge assembly and a pressure regulator function by means of a pressure regulating member. These two components which are generally cylindrical in shape are combined in a cross configuration with an intersecting passage between them at the cross over point. A metallic disc is crushed by the cartridge against a valve seat to provide a reliable lasting seal with the elimination of all leak paths except a single O-ring seal between the valve housing and the fluid container. Opening of the valve is provided by removing a support member from the metallic disc causing the disc to burst open and permit gas flow. A mechanical advantage latch actuated by a spring loaded trigger pin when released by a release pin provides the low pull force necessary for an actuation of the apparatus by aircraft cabin attendants. Impact dampening of the latched components upon release is provided by resilient O-rings which have proven to be very efficient in dampening the high forces released by the opening of the metallic disc. The high pressure gases communicated to the regulator member apply a load to the O-rings only after the release of the gas by the burst metallic disc and therefore, the O-ring seals are not under continuous high compression and are less likely to stick and cause regulation malfunction.

In accordance with one aspect of the invention there is provided a valve for mounting on a high pressue fluid container comprising a valve housing having a fluid conduit in communication with an inlet passage connected to the fluid container, a cartridge member positioned in the conduit and movable toward and away from the inlet passage, a valve seat in the conduit adjacent the inlet passage, a metallic plate member mounted on the cartridge member for seating on the valve seat, and pressure means for moving the cartridge toward the inlet passage to crush the plate against the valve seat and close the inlet passage.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION

Figure 1:
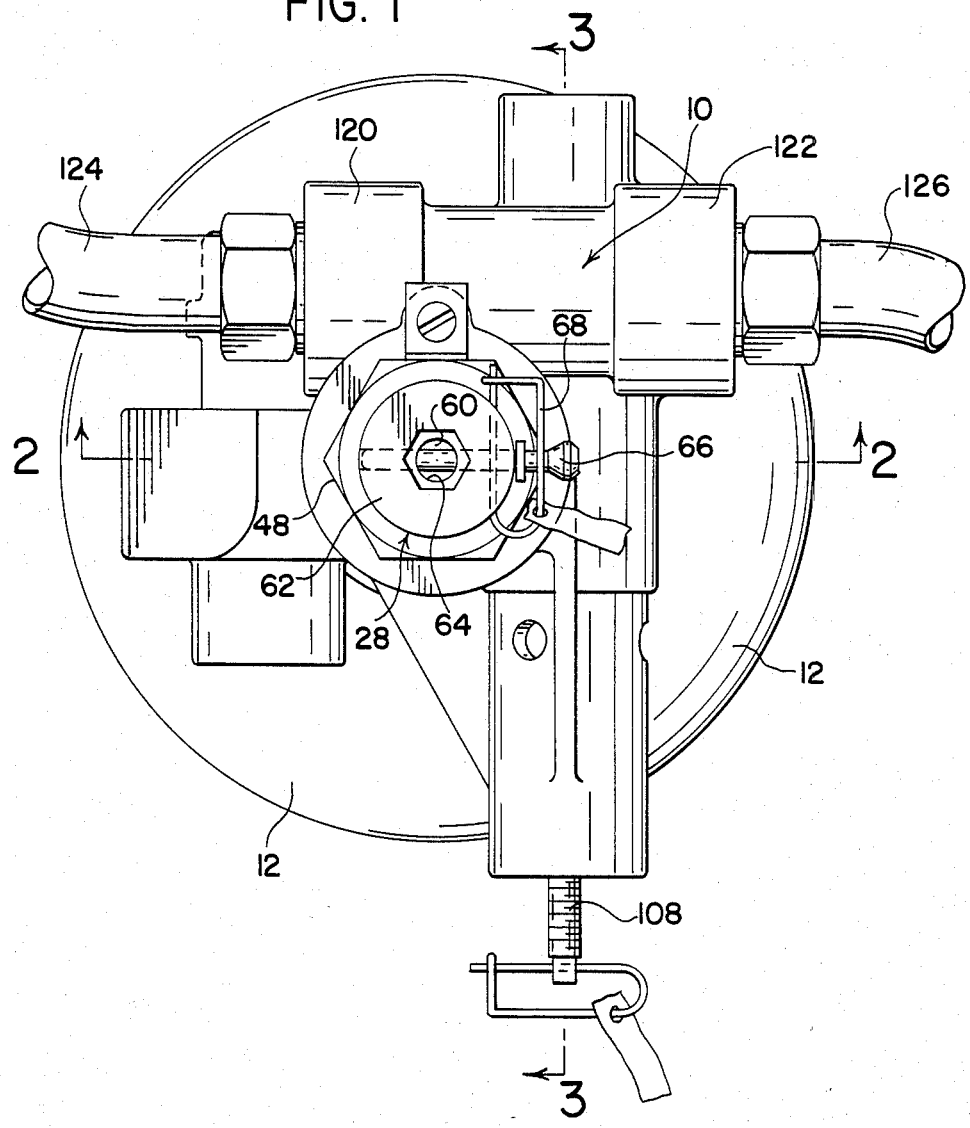
FIG. 1 is a plan view of the valve housing containing a valve and pressure regulator embodying the invention mounted on a fluid pressure container.
Figure 3:
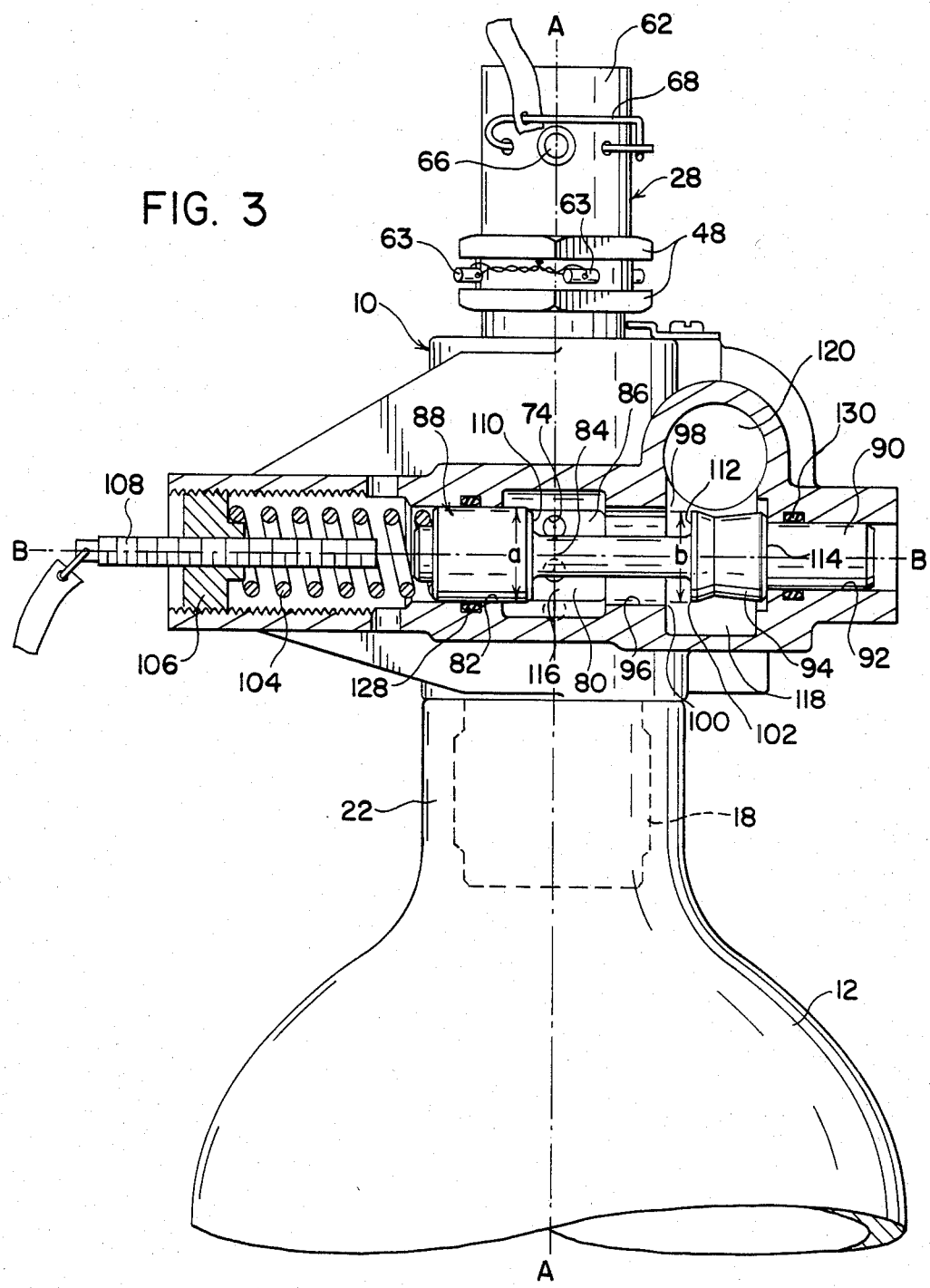
FIG. 3 is a sectional view taken along the line 3—3 in FIG. 1 with parts being broken away.

Referring to FIGS. 1 and 3 a valve housing 10 which may be a machined casting is shown mounted on a high pressure fluid container such as a metal bottle 12 for containing gases at pressures up to about 3,000 pounds per square inch (210.92 kilograms per square cemtimeter). A generally cylindrical fluid conduit 14 having an axis A—A is located in the valve housing 10 in communication with an inlet passage 16 which extends through a nipple 18 connected to the bottle 12 by a threaded connection 20 between the nipple 18 and a neck 22 of the bottle 12. An O-ring 24 may be positioned between the nipple 18 and neck 22 to provide a fluid tight seal between the bottle and the valve housing 10. For certain applications a screen plug 26 may be mounted at the end of the inlet passage 16.

Figure 2:
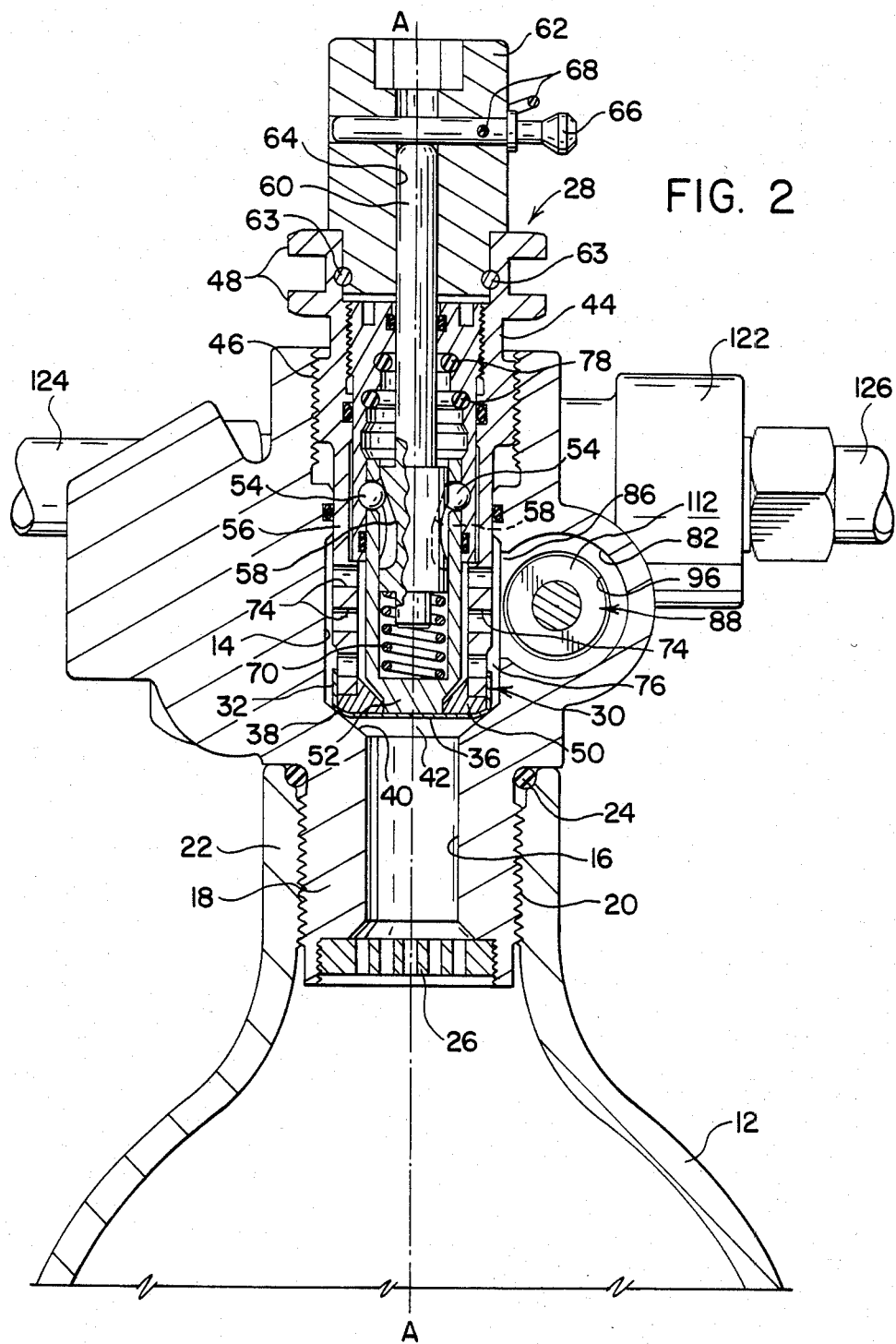
FIG. 2 is a sectional view taken along the line 2—2 in FIG. 1 with parts being broken away.
Figure 4:
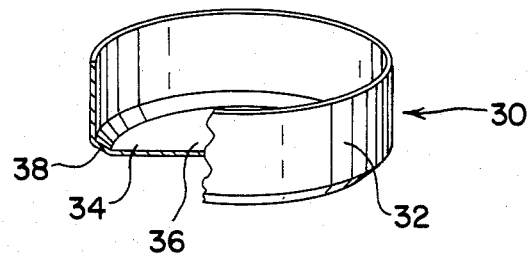
FIG. 4 is an enlarged view in perspective of the metallic disc with parts being broken away.

To seal the bottle 12 against the flow of high pressure gas through the inlet opening 16 a cartridge member such as release cartridge 28 is positioned in the fluid content 14 in the closed condition of the valve as shown in FIG. 2. A metallic plate member such as disc 30 shown in greater detail in FIG. 4. is mounted over the lower end of the cartridge 28. The disc 30 may have a cylindrical wall 32 and a circular base 34 with a central portion 36 and a peripheral edge 38 with a bevelled configuration to conform with a conical surface 40 of a valve seat 42 in the fluid content 14 adjacent the inlet passage 16. Preferably the disc 30 is of a soft metal such as dead soft aluminum (1100-O alloy) so that when the cartridge 28 is pressed downwards towards the inlet passage 16 the metal of the disc will be crushed against the surface 40 of the valve seat 42 providing a fluid tight seal.

Referring again to FIG. 2 the cartridge 28 has a generally cylindrical wall 44 with a threaded connection 46 with the valve housing 10. Hexagonal flanges 48 may be provided which are adaptable for gripping by a wrench to rotate the cartridge 28 to move it toward or away from the inlet passage 16. A disc support is provided which includes a thrust collar 50 mounted on the lower end of the wall 44 and a central support member such as engagement sleeve 52 which is positioned adjacent the thrust collar and in supporting relationship with the central portion 36 of the disc 30.

As shown in FIG. 2 the engagement sleeve 52 is held in the cartridge 28 by a latch providing a mechanical advantage which includes latching balls 54 movable into holes in the engagement sleeve 52 and a groove in a ball retainer sleeve 56 mounted in the wall 44 of the cartridge. The latching balls 54 are moved into the holes in the engagement sleeve by ramps 58 in a trigger pin 60 movable axially of the fluid conduit 14. The trigger pin 60 is part of a release means including a swivel cap 62 mounted for rotation on the wall 44 and held in position by retainer wires 63. The swivel cap 62 has a bore 64 in which the trigger pin 60 is slidable and a release pin 66 movable through an intersecting hole into position to block the bore and hold the trigger pin down in the cocked position as shown in FIG. 2. A safety pin 68 may be inserted through the swivel cap 62 and the release pin 66 to prevent the accidental operation of the apparatus. This safety pin 68 may be removed when the apparatus is ready for use.

An actuator spring 70 may be positioned within the engagement sleeve 52 and in engagement with the trigger pin 60 to urge the trigger pin upwardly as shown in FIG. 2 into engagement with the release pin 66 for providing sufficient pressure against the release pin to hold it in place while at the same time limiting the pressure so that an aircraft attendant can remove the release pin manually. Also when the release pin 66 is removed, the actuator spring 70 and the action of the latching balls 54 will raise the trigger pin 60 actuating the latch by allowing the latching balls 54 to move into the ramps 58 and out of the groove in the ball retainer sleeve 56 and the holes in the engagement sleeve 52.

Figure 5:
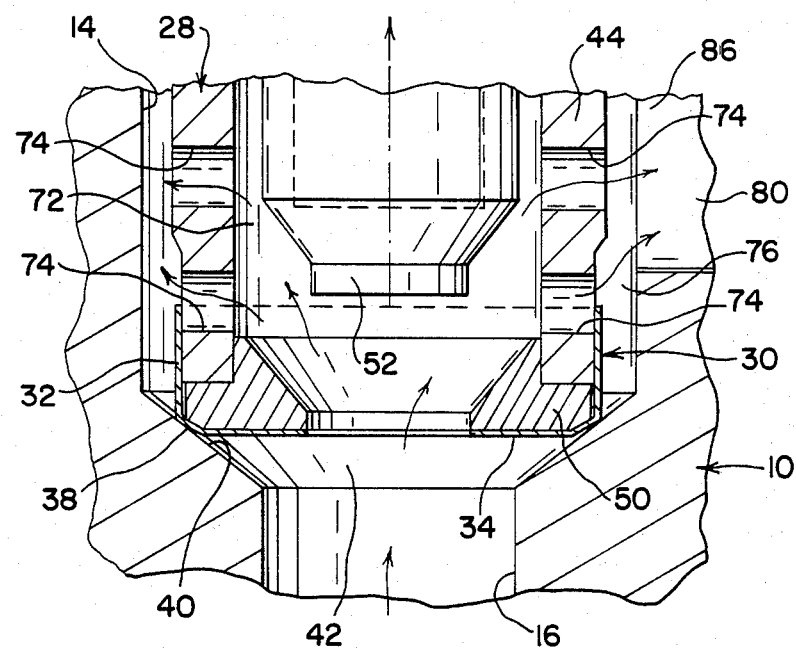
FIG. 5 is an enlarged fragmentary view of the valve showing the central support member retracted and the metallic disc in the burst condition with the high pressure fluid flowing through the opening in the disc and towards the pressure regulator.

In operation when the engagement sleeve 52 is released in this way the high pressure of the gas in the bottle 12 will rupture the unsupported central portion 36 of the disc 30 and force the engagement sleeve 52 upwardly to a position such as that shown in FIG. 5. The gases from the bottle 12 move in the direction shown by the arrows in FIG. 5 into a cartridge chamber 72 within the walls 44 and then through holes 74 in the wall 44 through an outlet passage 76. Impact dampers such as O-rings 78 of resilient material such as Nitrile rubber may be mounted in the ball retainer sleeve 56 of the cartridge 28 to cushion the impact of the trigger pin 60 and engagement sleeve 52 which are propelled upward by the high pressure gases into engagement with the cartridge upon rupture of the disc 30.

The outlet passage 76 is in communication with an inlet port 80 of a generally cylindrical pressure regulator chamber 82 in the valve housing 10 which is shown more clearly in FIG. 3. The pressure regulator chamber 82 has an axis B—B which is in cross configuration with the axis A—A of the fluid conduit 14 so that at a cross over point 84 the outlet passage 76 of the fluid conduit 14 and the inlet port 80 of the pressure regulator chamber 82 are combined in an intersecting passage 86.

Axially movable within the pressure regulator chamber 82 is a regulator member or piston 88 having a piston rod 90 slidably movable in a cylindrical opening 92 at the right end of the housing as shown in FIG. 3. A spool member 94 is mounted on the piston rod 90 and is movable to the left as shown in FIG. 3 into the cylindrical opening 96 providing a gas discharge orifice 98 between an edge 100 of the cylindrical opening 92 and an edge 102 of the spool member 94. The pressure regulator also includes a spring 104 and a spring adjuster 106 threaded in the pressure regulator chamber 82 for increasing or decreasing the compression of the spring acting on the piston 88. As shown in FIG. 3 a stop means such as spool stop screw 108 may be threaded in the spring adjuster 106 during charging of the bottle 12 with high pressure fluid to prevent over stroking the piston 88 and damaging the spring 104.

The piston 88 has an end area 110, the diameter of which is indicated by letter "a" in FIG. 3 which is greater than the end area 112 at the left side of the spool member 94, the diameter of which is indicated by letter "b" in FIG. 3. The spool also has a small end area 114 at the right side as shown in FIG. 3.

In operation the high pressure gas is communicated to a high pressure section 116 of the pressure regulator chamber 82 upon opening of the bottle 12 by rupturing the disc 30. This high pressure gas acts on the end area 110 of the piston 88 causing the piston and piston rod 90 to move to the left as shown in FIG. 3 to a position where the force of the spring 104 plus the force of the gas against the end area 112 of the spool member 94 is equal to the force from the gas pressure against the end area 110 of the piston and the pressure of the low pressure gas against the end area 114 of the spool. The gas discharge orifice 98 is then at a position to provide low pressure gas in a low pressure section 118 of the pressure regulator chamber 82 which is then communicated through outlet ports such as discharge ports 120,122 connected by hoses 124,126 to an inflatable or to aspirators for the inflatable.

Seals such as O-rings 128, 130 may be provided in the regulator chamber 82, however; they are only loaded after the release of the gas by the burst disc 30 and therefore are not under a high compression and are less likely to stick and cause regulation malfunction. In operation the high pressure gas from the intersecting passage 86 is at approximately 3,000 pounds per square inch (210.92 kilograms per square centimeter) and in this embodiment the delivery pressure at the hoses 124,126 is around 300 pounds per square inch plus 40 and minus 30 pounds per square inch (210.92 plus 2.81 and minus 2.11 kilograms per square centimeter). It is understood however, that this apparatus can be modified to provide delivery pressures of from 100 to 1,000 pounds per square inch (7.03 to 70.31 kilograms per square centimeter. The gas pressure in the bottle 12 may in some applications be from 1,000 to 10,000 pounds per square inch (70.31 to 703.10 kilograms per square centimeter).

With this apparatus the bottle 12 may be charged with high pressure gas by closing one of the discharged ports 120,122 and connecting the other port to a source of high pressure gas. The spool stop screw 108 is inserted to protect the spring 104 and the cartridge 28 is rotated to move the disc 30 away from the valve seat 42 providing a passage for the high pressure gas between the disc 30 and surface 40 of the valve seat through the inlet passage 16 and into the bottle 12. After the pressure in the bottle has reached the desired level the cartridge 28 is rotated in the opposite direction so that through the threaded connection 46 the disc 30 is forced against the conical surface 40 of the valve seat 42 with sufficient force to crush the soft aluminum and provide a seal. It has been found that a torque of 50 foot pounds (6.9 meter-kilograms) is sufficient to effect a seal.

As indicated above the swivel cap 62 may be rotated to a desired position so that it may be operated by means of a lanyard normal to the axis A—A of conduit 14 and from any direction in a 360 degree arc. The retainer wire 63 is readily removable to permit disassembly of the cartridge 28 for rebuilding so that it may function for at least 100 cycles.

It is understood that other mechanical advantage means for actuating high pressure vessels may be used as an alternative to the latching balls mechanism described hereinabove. With this mechanism only about one tenth of the force exerted by the high pressure gas on the cartridge 28 is exerted against the release pin 66 whereas nine tenths of the force is carried by the latching balls 54.

While a certain representative embodiment and details have been shown for the purpose of illustrating the invention it will be apparent to those skilled in the art that various changes and modifications other than those referred to may be made therein without departing from the spirit or scope of the invention.

We claim:

1. A valve for mounting on a high pressure fluid container comprising a valve housing having a fluid conduit in communication with an inlet passage connected to said fluid container, a cartridge member positioned in said conduit and movable toward and away from said inlet passage, a valve seat in said conduit adjacent said inlet passage, a soft metallic plate member mounted on said cartridge member for seating on said valve seat, pressure means for moving said cartridge toward said inlet passage to crush said plate against said valve seat and close said inlet passage, said pressure means includes a threaded connection between said valve housing and said cartridge, said cartridge having a disc support including a thrust collar member engageable with an outer periphery of said disc for pressing a peripheral edge of said disc against a surface of said valve seat in fluid sealing relationship, said disc support including a central support member positioned adjacent said thrust collar member for supporting a central portion of said disc, latch means connecting said cartridge and said central support member for retaining said central support member in a supporting position, release means for releasing said latch means and permitting movement of said central support member away from said disc so that said central portion of said disc is unsupported and may burst to communicate high pressure fluid from said fluid pressure container to the space within said fluid conduit; resilient rings mounted on said cartridge in axially spaced relationship at positions spaced from said support member and said latch means in the closed condition for absorbing impact forces when said disc bursts and said high pressure fluid acts against said central support member and said latch means, said valve housing having an outlet passage communicating with openings in said cartridge, said openings in said cartridge communicate directly with said fluid container after bursting of said disc, a regulator chamber in direct communication with said outlet passage, said regulator chamber having an axially movable member to control the flow of fluids therethrough, said movable member having a pair of spaced spools, an outlet opening communicating with said regulator chamber adjacent one of said spools, said one spool operative to regulate the pressure and flow of fluid through said outlet opening by cooperative action with an annular edge of said chamber, the other ones of said spools spaced from said one spool and being greater in surface area than said one spool to facilitate the control of fluid past said one spool to said outlet opening.

2. A valve in accordance with claim 1 wherein said pressure regulator chamber has an axis generally crossing the axis of said valve fluid conduit providing a cross configuration with an intersecting passage at the crossover point, and said intersecting passage including said valve outlet passage.

3. A valve in accordance with claim 2 wherein said chamber has a spring located therein for urging said movable member in a direction to open said outlet opening adjacent said one spool during passage of high pressure gas into said regulator chamber, and stop means to limit the amount of compression of said spring during filling of said fluid container.

4. A valve in accordance with claim 3 including means to fill said fluid container with high pressure gas comprising means to introduce said gas through said outlet opening into said regulator chamber for passage through said intersecting passage into said valve fluid conduit, means to release said pressure means to move said cartridge and said disc out of engagement with said valve seat for communicating pressure fluid through said inlet passage into said fluid container, and means to apply said pressure means for closing said inlet passage after filling said fluid pressure container.

* * * * *